(12) United States Patent
Vollmuth et al.

(10) Patent No.: US 7,514,828 B2
(45) Date of Patent: Apr. 7, 2009

(54) STATOR FOR AN ELECTRICAL MACHINE

(75) Inventors: Alfons Vollmuth, Dittelbrunn-Hambach (DE); Khalid Jafoui, Trunstadt (DE); Marcus van Heyden, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 165 days.

(21) Appl. No.: 11/377,410

(22) Filed: Mar. 16, 2006

(65) Prior Publication Data
US 2006/0208585 A1 Sep. 21, 2006

(30) Foreign Application Priority Data
Mar. 17, 2005 (EP) .................. 05005796

(51) Int. Cl.
*H02K 3/00* (2006.01)
*H02K 3/46* (2006.01)

(52) U.S. Cl. ....................................................... 310/71
(58) Field of Classification Search .................. 310/71, 310/259
See application file for complete search history.

(56) References Cited

U.S. PATENT DOCUMENTS

| 3,979,615 | A | * | 9/1976 | Neff ............................. 310/71 |
| 5,828,147 | A | * | 10/1998 | Best et al. ..................... 310/71 |
| 5,936,326 | A | * | 8/1999 | Umeda et al. ................ 310/179 |
| 5,986,374 | A | * | 11/1999 | Kawakami ............. 310/156.13 |
| 6,369,473 | B1 | | 4/2002 | Baumeister et al. |
| 6,501,205 | B1 | * | 12/2002 | Asao et al. .................. 310/184 |
| 6,538,356 | B1 | * | 3/2003 | Jones .......................... 310/254 |
| 6,600,244 | B2 | * | 7/2003 | Okazaki et al. ................ 310/71 |
| 6,674,195 | B2 | * | 1/2004 | Yagyu et al. ................... 310/71 |
| 6,707,186 | B2 | | 3/2004 | Oppitz |
| 6,856,057 | B2 | * | 2/2005 | Kobayashi et al. ............. 310/71 |
| 6,914,356 | B2 | * | 7/2005 | Yamamura et al. ............. 310/71 |
| 6,924,570 | B2 | * | 8/2005 | De Filippis et al. ........... 310/71 |
| 6,949,848 | B2 | * | 9/2005 | Yamada et al. ................. 310/71 |
| 6,958,560 | B2 | * | 10/2005 | Holzheu et al. .............. 310/179 |
| 7,045,920 | B2 | * | 5/2006 | Ohuchi et al. .................. 310/71 |
| 7,091,645 | B2 | * | 8/2006 | Yoneda et al. ............... 310/208 |
| 7,135,793 | B2 | * | 11/2006 | Seguchi et al. ................ 310/71 |
| 2001/0048262 | A1 | * | 12/2001 | Takano et al. ............... 310/179 |
| 2002/0148526 | A1 | * | 10/2002 | Bonnacorsi et al. ........ 140/92.2 |
| 2003/0090166 | A1 | | 5/2003 | Kobayashi et al. |

(Continued)

FOREIGN PATENT DOCUMENTS

JP    2003 333789    11/2003

OTHER PUBLICATIONS

Search Report dated Oct. 5, 2005 issued for the corresponding European Application No. EP 05 00 5796.

*Primary Examiner*—Burton Mullins
(74) *Attorney, Agent, or Firm*—Cohen Pontani Lieberman & Pavane LLP

(57) ABSTRACT

A stator for an electrical machine includes a plurality of coils arranged on a stator yoke, each coil having a pair of ends; a plurality of linking conductors which are electrically insulated from each other, each conductor having a terminal element electrically connected to two ends of two adjacent coils; and a support structure mounted on the stator yoke, the support structure having a receiving channel which holds the linking conductors and a wiring channel into which the terminal elements and the ends of the coils project. The terminal elements and the ends of the coils are electrically connected by conductor bridge elements arranged serially in the wiring channel.

19 Claims, 5 Drawing Sheets

U.S. PATENT DOCUMENTS

| | | |
|---|---|---|
| 2004/0051417 A1 | 3/2004 | Yamazaki et al. |
| 2004/0070305 A1* | 4/2004 | Neet .......................... 310/254 |
| 2004/0256936 A1 | 12/2004 | Takahashi et al. |
| 2005/0012413 A1* | 1/2005 | Bott et al. ..................... 310/71 |
| 2005/0172506 A1* | 8/2005 | Collingwood et al. ......... 33/561 |

* cited by examiner

STATOR FOR AN ELECTRICAL MACHINE

BACKGROUND OF THE INVENTION

1. Field of the Invention

The invention pertains to a stator for an electrical machine having a stator yoke, coils arranged on the stator yoke, and linking conductors have terminal elements which are each electrically connected to two ends of two respective coils.

2. Description of the Related Art

Known stators for electrical machines have a stator yoke with a number of stator teeth, which carry the electrical winding in the form of, for example, individually wound stator coils of insulated wire. The two ends of each coil are assigned to individual strands and are connected to each other in a predetermined manner by common linking conductors. In the case of a three-phase machine, the stator has three strands and thus at least three linking conductors, each of which is supplied with current with a phase offset of 120°. The linking conductors are wired to a switch box so that the electrical machine can be connected to a power source.

U.S. Pat. No. 6,369,473 discloses a stator for an electrical machine in which the wiring arrangement has electrically insulated linking conductors which are concentric with respect to each other. The terminals which accept the ends of the stator coils are in the form of projections extending from the linking conductors. For each coil end, a separate terminal projection is provided, and as a result of the radial staggering of the linking conductors thus realized here, the connecting points are also in different radial positions. The electrical connections can be realized here by a joining technique such as welding or soldering and/or by simply winding the wire around the terminal projection. The linking conductors are supported against each other and against the stator by interposed strips of insulating material.

Producing welded or soldered connections is highly labor-intensive and therefore expensive. There is also the disadvantage that the process heat introduced during the production of the connections can lead to damage to the insulation between the linking conductors and to the insulation on the winding wires in the area of the coils. As a result, undesirable electrical short-circuits can develop very quickly; these negatively affect the operation of the electrical machine and can even lead to its failure. Damage to the insulation provided between the linking conductors can also interfere with the stability with which the linking conductors are held in position. If they are no longer held in position reliably, they can no longer operate reliably either. Vibrations which can occur during the operation of the electrical machine or which are imposed on it from the outside lead to alternating mechanical loads on the electrical connections of the machine, which can come loose within a very short time. The wrapping of the terminal extensions represents a typical manual process, furthermore, which stands in the way of increasing the efficiency with which stators of this type can be manufactured. Because of the relatively large number of coil ends, there is also considerable danger that they will be connected incorrectly when the stator coils are being connected, that is, that they will be assigned incorrectly to their intended linking conductors. Even if great care is taken, it is still impossible to be 100% certain that all of the connections are made properly during the production of these stators.

U.S. Pat. No. 6,707,186 describes a stator of the general type in question with a wiring arrangement in which the linking conductors are arranged radially with respect to each other and have axially projecting terminals at predetermined positions for establishing connections with the ends of the stator coils. Receiving elements are formed on the winding bodies of the stator coils. The number of receiving elements present at each end of the coil is equal to the number of linking conductors. To establish the desired electrical contact, a coil end is first passed through all of the receiving elements, and then, by introducing one of the terminals between the associated coil end and the linking conductor, an electrical clamping-type of connection is formed. As an alternative to the forming of projecting terminals on the linking conductors, separate plug contacts can also be provided on them, each of which is then inserted into a receiving element to form a clamping-type of connection with an end of a coil.

In the case of a wiring arrangement with three linking conductors, this means that, although the coil ends must first be cut to length for all of the receiving elements, two of the three receiving elements per coil end are not used and remain unoccupied. When the linking conductors are arranged radially as described here, furthermore, the width of the unit is increased in the axial direction, because only the axially projecting terminals fit into the receiving elements, not the linking conductors themselves. This also results in the disadvantage that the linking conductors are mounted on the stator in such a way that they are not protected against vibrations or environmental influences.

SUMMARY OF THE INVENTION

An object of the present invention is to improve the design of a stator of the type described above in such a way that the individual processes involved in producing the wiring arrangement can be accomplished reliably and also so that the linking conductors and the contact points of the coil ends are mounted on the stator in such a way that they are protected.

According to the invention, a support structure mounted on the stator yoke is provided with a receiving area for the linking conductors and a wiring area into which the ends of the coils and the terminal elements project.

Designing a support structure with a receiving area to hold the linking conductors makes it possible, first, to hold the linking conductors reliably in place on the stator under operating conditions. Second, by providing a wiring area insulated from the linking conductors, which is also formed on the support structure, the elements to be wired together are clearly and logically arranged. Thus, as a result of this design, a space-saving structure is provided, which also creates the prerequisite for defect-free wiring work.

It is especially advantageous for the ends of the coils and the terminal elements to project into the wiring area only at spatially predetermined positions, where they are then available for further connecting operations.

A sturdy wiring arrangement almost completely sealed off from the outside can be achieved by designing the receiving area and the wiring area as grooves which are open on one side. Even better protection against external influences such as dust and moisture is obtained by sealing off the receiving area and/or the wiring area with a sealant, which fills up the open ring-shaped space and thus embeds the contact areas present in it.

To achieve the shortest possible conductive connections between the ends of the coils and the linking conductors, it is advantageous to arrange the support structure directly on the coil winding bodies. As a result, the vibrations to which the electrical machine is subjected during operation can be reduced significantly, especially at the electrical contact areas of the wiring arrangement. The support structure can be formed out of individual segments, each of which is formed as an integral part of a winding body. Alternatively, the segments can be separate from the winding bodies, or the structure can be designed as a ring-shaped element.

In an especially advantageous variant, the wiring of the coil ends is carried out with the use of conductor bridge elements, which are preferably designed as thin-walled sheet metal strips, which can fit into the wiring area in only one predetermined way, where advisably the coil ends and the terminal elements are connected to the conductor bridge elements by a clamping-type connection. For various reasons this makes it possible for the electrical machine to be wired both quickly and correctly.

With respect to the automated realization of the wiring process, it is especially advantageous for the electrical contact areas between the coil ends and the linking conductors to be located in a common axial and radial position, where the end of one coil and the circumferentially adjacent end of a second coil are assigned to one and the same linking conductor by a common terminal element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
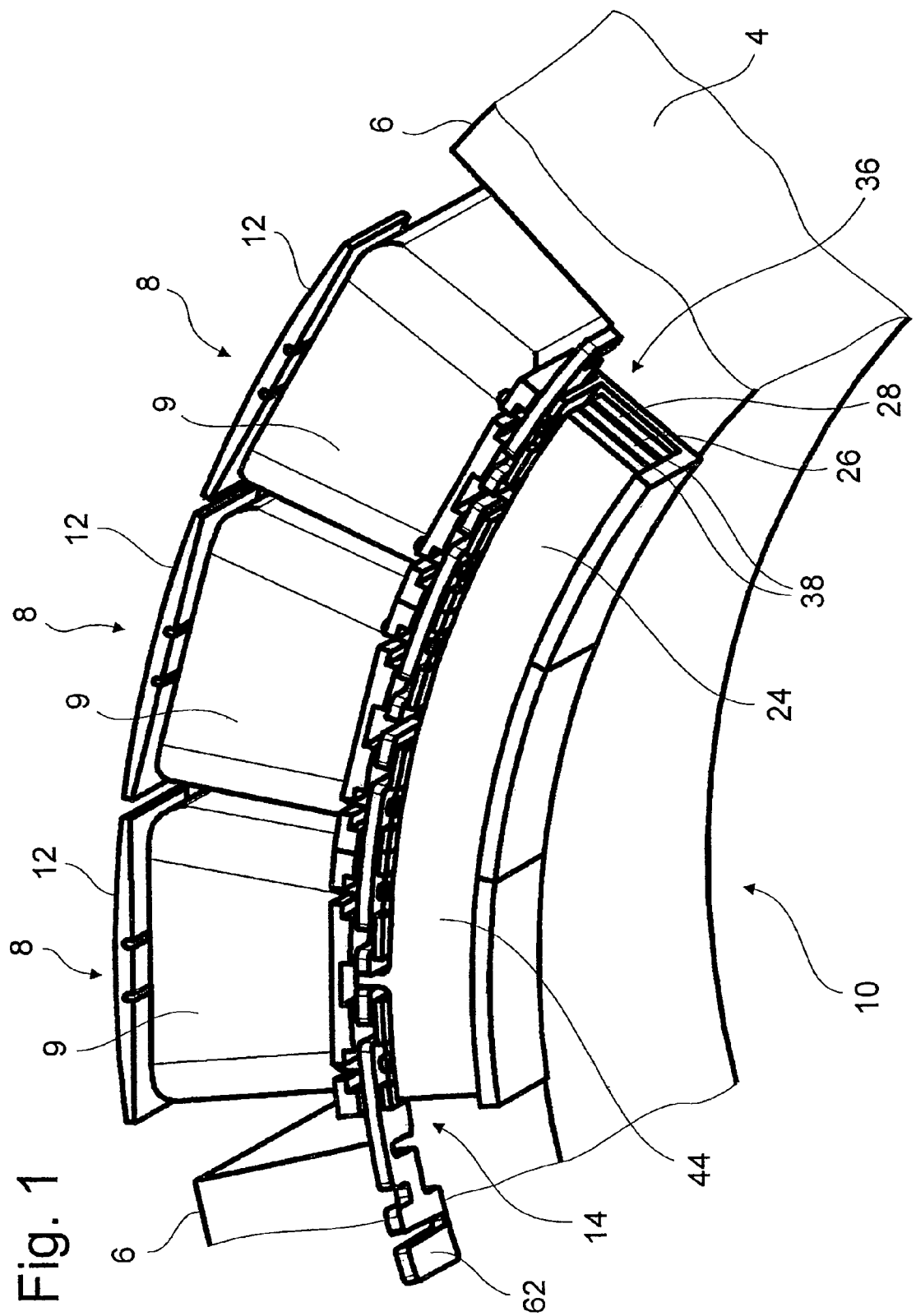
FIG. 1 shows a perspective view of a stator equipped with individual coils and with a wiring arrangement mounted on the stator.

The figures show part of a stator 10 for an electrical machine (not shown). The stator has a ring-shaped stator yoke 4 consisting of laminations of electric steel. This is the stator of a synchronous electrical machine of the external rotor type excited by permanent magnets, although the special design of the electrical machine is irrelevant to the following explanation. The stator yoke 4 has a number of radially outward-oriented teeth 6 arranged around the circumference. Each tooth 6 carries an individual coil 8. The coils 8 consist of windings 9 of a single or multi-strand conductor. The individual conductors can be twisted around each other.

Each individual coil 8 is first wound separately in a preceding production step on two winding bodies 12, consisting of insulating material, and then pushed onto a tooth 6 of the stator yoke 4, where it is secured against slipping by a latching connection. Each, coil 8 has two ends 18, 20, which extend out from the coil 8 in the radially inward direction and are available at a common end surface of the stator 10 for connection. The coils 8 are assigned to individual strands and, as will be explained in greater detail below, are wired together in a predetermined manner by the use of common linking conductors 24, 26, 28, which are components of a wiring arrangement 14. For this purpose, the linking conductors 24, 26, 28 are arranged coaxially with respect to each other and are staggered axially on the stator 10. They are mounted radially inside the coils 8. Insulating disks 38 are provided between the linking conductors 24, 26, 28 to insulate them from each other.

Figure 2:
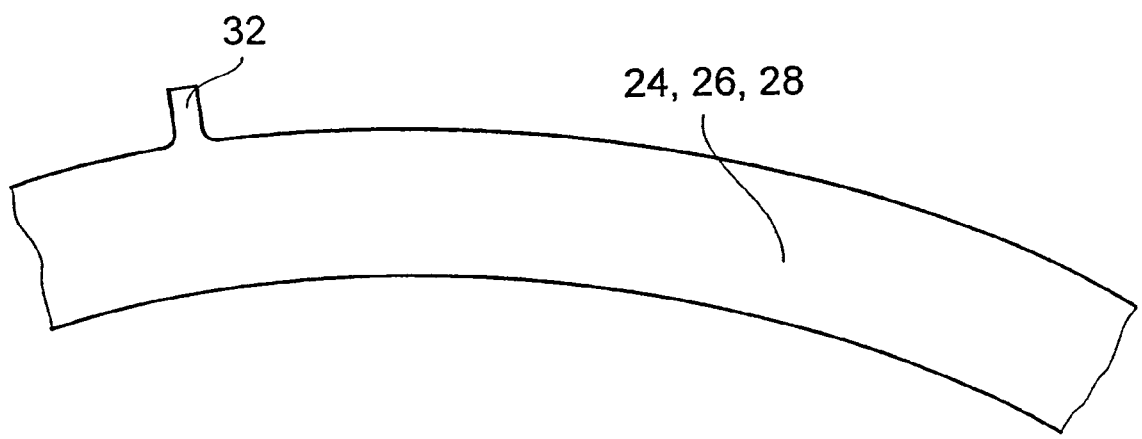
FIG. 2 shows part of a linking conductor in the form of a circular ring with laterally projecting terminal elements, which can be connected to the ends of the coils.
Figure 3:
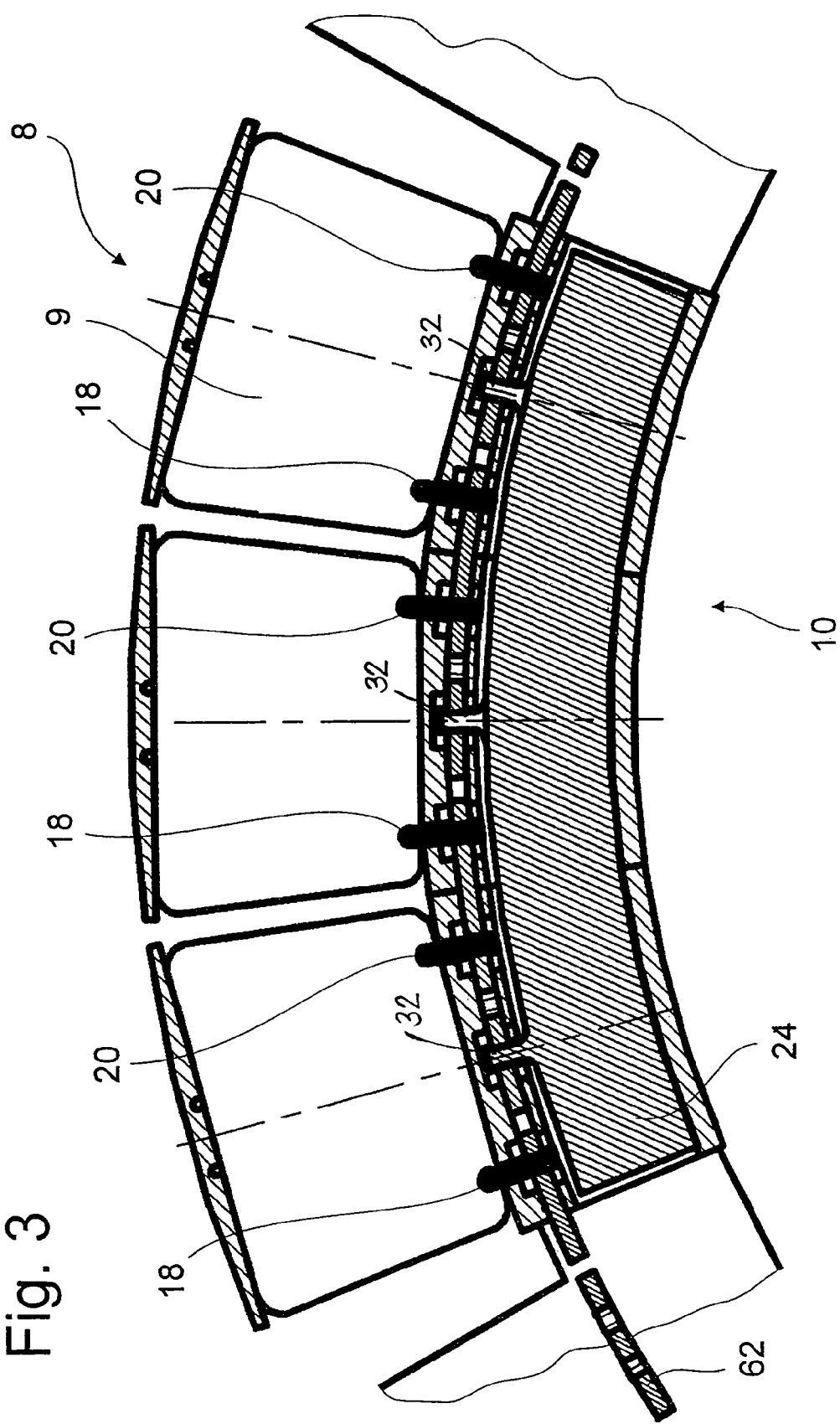
FIG. 3 shows a radial cross section through the stator of FIG. 1 in the exit plane of the coil ends.

According to the diagram of FIG. 2, the linking conductors 24, 26, 28 are designed as strip conductors of copper, for example, which have been formed into a ring shape by edge-rolling in a plane. Several radially outward-projecting, tab-like terminal elements 32, only one of which is shown in FIG. 2, are positioned at specific points on the circumference within the plane of the ring and used to connect the conductor to the ends 18, 20 of the coils.

On the stator, the linking conductors 24, 26, 28 are inserted into a receiving area 44, designed as a groove open on one side, in a support structure 36. The support structure 36, as can be seen in FIG. 1, is made up of individual segments. The individual segments are designed as integral parts of the winding bodies 12, which cooperate with the stator to form a closed ring structure.

Figure 4:
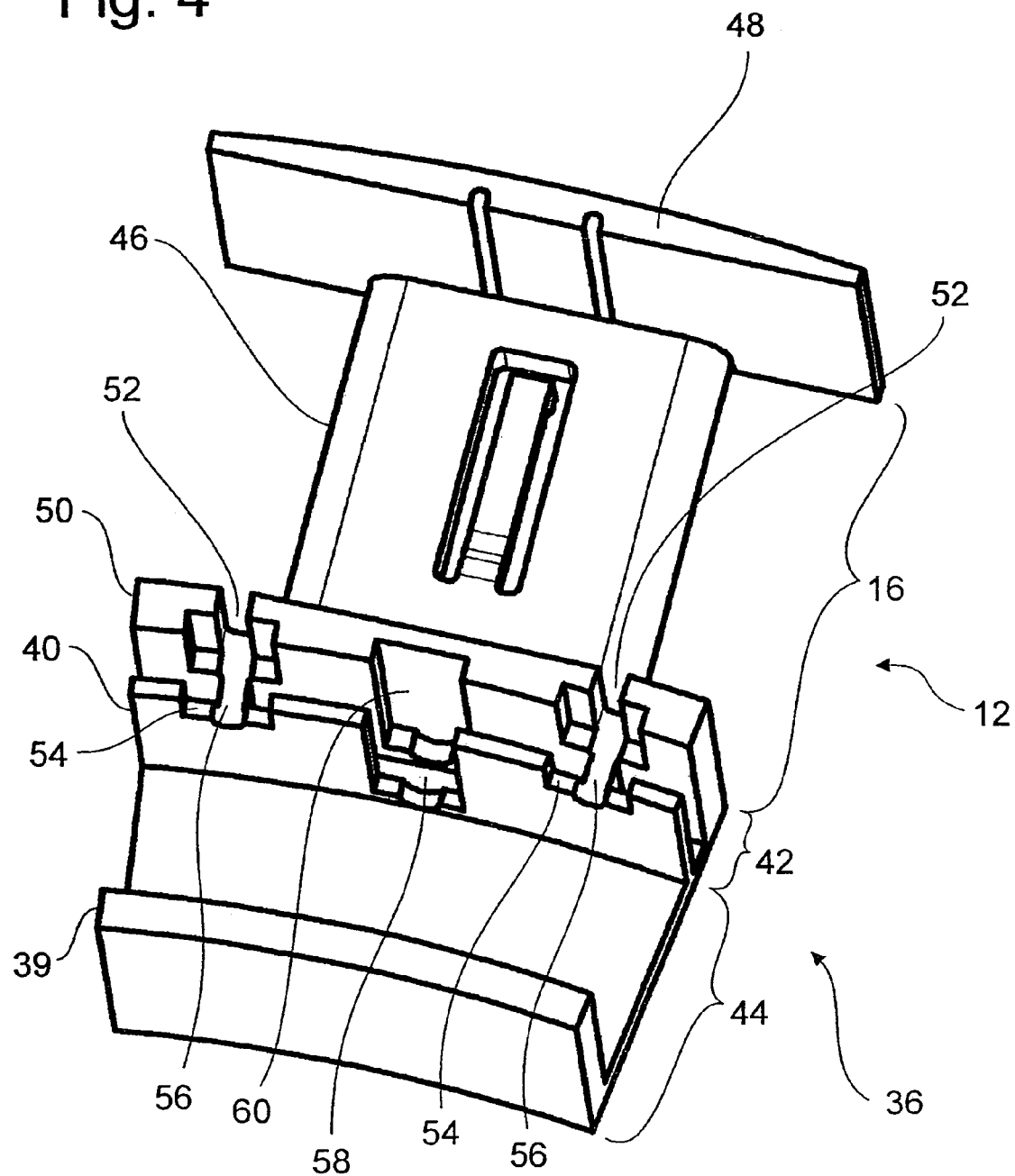
FIG. 4 shows a winding body with a receiving space formed on it to hold the linking conductors.

On the side of the stator with the wiring arrangement 14, the winding bodies 12 shown in FIG. 4 have a conventional winding area 16 to hold the winding 9. This area is formed by a base area 46 resting against the stator yoke 4 and two laterally projecting sidepieces 48, 50. To form a segment of the support structure 36, the base area 46 is extended radially inward with respect to the structure of the electrical machine. Two webs 39, 40, furthermore, which extend from the extended base in the axial direction, are also provided. As a result, a groove-shaped wiring area 42, open on one side, directly adjacent to the winding area 16, and a receiving area 44, also open on one side, to hold the linking conductors 24, 26, 28 are formed.

The sidepiece 50 and the web 40 each include two radially oriented recesses 52, 54, through which the coil ends 18, 20 pass and in which they are held. The coil ends can thus be supported on the contact areas 56, which are molded here in the wiring area 42. Another recess 58 is provided, through which a terminal element 32 can be introduced from the receiving area 44 into the wiring area 42, the end of the terminal element 32 being held positively there in a recess 60 formed inside the sidepiece 50. Thus it is ensured that the coil ends and the terminal elements can project into the wiring area only at spatially predetermined positions, where they are then available for further connection.

Alternatively to the support structure 36 assembled from individual segments shown here, the structure could also be produced as a separate plastic ring and mounted on the winding bodies 12, where the wiring area 42 could then belong either to a winding body 12 or to the support structure 36 or to both, as desired.

In the exemplary embodiment, each of the radially oriented terminal elements 32 is arranged in the circumferential direction of the stator 4 so that it lies between the two ends 18, 20 of one coil 8. The terminal elements 32, however, could also be arranged so that they lie between the end 18 of one coil 8 and the end 20 of an adjacent coil.

Figure 5A:
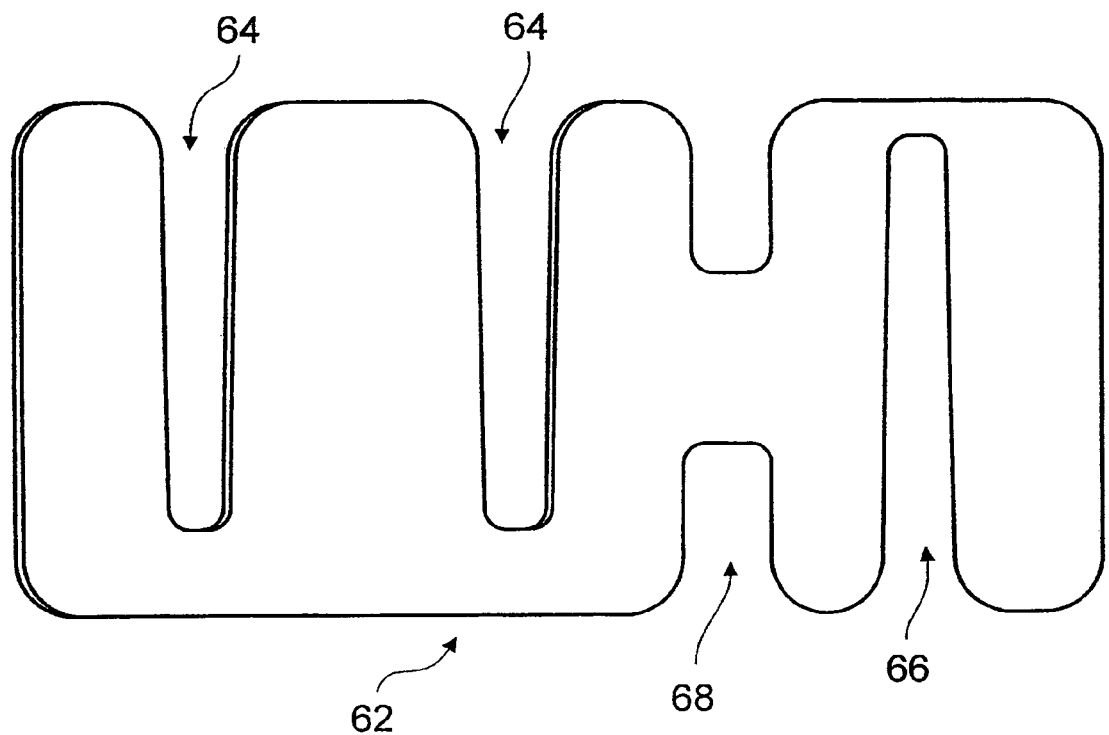
FIGS. 5a and 5b show conductor bridge elements used to connect the coil ends to a linking conductor.

To wire the coil ends 18, 20, they are first bent over from the winding body 12 in the radially inward direction and laid in the recesses 52, 54 provided for them in the wiring area 42. Simultaneously, the ends of the coils make contact with the contact areas 56. A terminal element 32 of a linking conductor 24, 26, 28 is contacted electrically with the ends 18, 20 of two adjacent coils 8 by the use of a conductor bridge element 62, consisting of a thin-walled sheet metal strip as shown in FIG. 5a, which is inserted into the wiring area 42 between two coils. Two slots 64, proceeding from the same side, are provided in this bridge element to hold the two adjacent coil ends 18, 20 of two adjacent coils 8, and an additional slot 66, proceeding from the opposite side, is provided to hold a terminal element 32. To give the wiring arrangement 14 a certain elasticity to compensate for thermal expansion and to minimize the influence of operationally caused vibrations at the coil ends 18, 20, the conductor bridge element 62 is also provided with an additional expansion structure 68 in the form of openings.

When the conductor bridge element 62 is inserted, the coil ends 18, 20 are pressed into the slots 64 and clamped between the edges of these slots, which act as blade clamps.

Then the linking conductors 24, 26, 28 and the insulating disks 38 are introduced into the conductor receiving area 44. The terminal elements 32 of the various conductors are offset from each other in the circumferential direction, so that only a single terminal 32 of one of the linking conductors 24, 26, 28 can be introduced through a recess 58 and into the wiring area 42, where it is held with a clamping action in the slot 66 of the conductor bridge element 62 situated there.

The distances between the slots 64, 66 of the conductor bridge elements 62 can be selected in such a way that the bridge elements will fit into the wiring area 42 in only one predetermined position or with only one orientation. This guarantees that the end 18 of a coil 8 and the circumferentially adjacent end 20 of a second coil can be assigned to one and the same linking conductor 24, 26, 28 by a common terminal element 32. This also guarantees that short-circuits between the two ends 18, 20 of one and the same coil 8 are avoided. Overall, therefore, all of the contact areas of the coil ends 18, 20 with the conductor bridge elements 62 and of the terminal elements 32 with the conductor bridge elements are arranged in a common radial position and also in an essentially common axial position. This offers the advantage that, when a conductor bridge element 62 is inserted, two coil ends 18, 20, are connected simultaneously to one of the linking conductors.

Figure 5B:
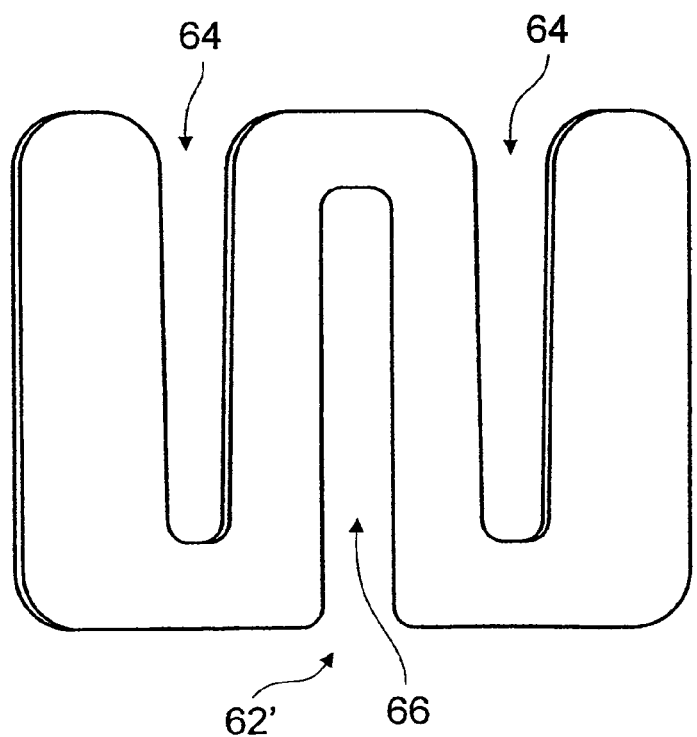

If, alternatively to the example explained above, the terminal elements 32 lie between the end 18 of one coil 8 and the end 20 of the adjacent coil, then the corresponding conductor bridge element 62', as shown in FIG. 5b, can have a much more compact design, and in addition a high degree of mechanical flexibility is provided without need for an additional expansion structure.

To protect the linking conductors 24, 26, 28 and the contact areas 56 from corrosion and to increase the sturdiness of the wiring arrangement 16, the wiring area 42 and/or the receiving area 44 can be cast in a sealant. The linking conductors 24, 26, 28 and the contact areas of the conductor bridge elements 62 will then be completely encapsulated against the environment.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A stator for an electrical machine, said stator comprising:
   a stator yoke;
   a plurality of coils arranged on the stator yoke, each coil having a pair of ends;
   three linking conductors disposed in three parallel planes and electrically insulated from each other, each said linking conductor having a plurality of terminal elements wherein each said terminal element is electrically connected to two said ends of two respective coils which lie on a common circle of one of said planes with the terminal element which electrically connects the two said ends; and
   a support structure mounted on the stator yoke, the support structure having a receiving area which holds the linking conductors and a wiring area into which the terminal elements and the ends of the coils project, the terminal elements and the ends of the coils being electrically connected in the wiring area.

2. The stator of claim 1 wherein the ends of the coils and the terminal elements project into the wiring area at spatially predetermined positions.

3. The stator of claim 1 wherein the receiving area and the wiring area are open channels.

4. The stator of claim 1 further comprising a sealant in at least one of said receiving area and said wiring area.

5. The stator of claim 1 further comprising a plurality of winding bodies on which respective said coils are wound, said winding bodies being located on said support structure.

6. The stator of claim 1 wherein the receiving area is a channel in which the linking conductors are axially received in parallel.

7. A stator for an electrical machine, said stator comprising:
   a stator yoke:
   a plurality of coils arranged on the stator yoke, each coil having a pair of ends;
   a plurality of linking conductors which are electrically insulated from each other, each said linking conductor having a plurality of terminal elements wherein each said terminal element is electrically connected to two said ends of two respective coils;
   a support structure mounted on the stator yoke, the support structure having a receiving area which holds the linking conductors and a wiring area into which the terminal elements and the ends of the coils project, the terminal elements and the ends of the coils being electrically connected in the wiring area; and
   conductor bridge elements received in said wiring area, each said bridge element connecting the two said ends of two respective coils to a terminal element of a linking conductor.

8. The stator of claim 7 wherein the conductor bridge elements can only fit into the wiring area in predetermined positions.

9. The stator of claim 7 wherein the conductor bridge elements have slots which receive the ends of the coils and the terminal elements to form clamp-type connections.

10. The stator of claim 7 wherein the conductor bridge elements are stamped from sheet metal.

11. The stator of claim 7 wherein the terminal element lies circumferentially between the ends of a single coil, the two said ends of two adjacent coils being connected to said conductor bridge element to one side of the terminal element connecting the ends.

12. The stator of claim 7 wherein the terminal element lies circumferentially between two said ends of two adjacent coils, the two said ends of two adjacent coils being connected to said conductor bridge element on either side of the terminal element connecting the ends.

13. The stator of claim 7 wherein the wiring area is a channel in which the conductor bridge elements are received serially.

14. The stator of claim 13 wherein said channel lies radially between said coils and said linking conductors, said terminal ends of said coils and said terminal elements extending radially into said channel.

15. The stator of claim 7 wherein the ends of the coils and the terminal elements project into the wiring area at spatially predetermined positions.

16. The stator of claim 7 wherein the receiving area and the wiring area are open channels.

17. The stator of claim 7 further comprising a sealant in at least one of said receiving area and said wiring area.

18. The stator of claim 7 further comprising a plurality of winding bodies on which respective said coils are wound, said winding bodies being located on said support structure.

19. The stator of claim 7 wherein the receiving area is a channel in which the three linking conductors are axially received in parallel.

* * * * *